United States Patent [19]

Kruse et al.

[11] Patent Number: 5,259,252
[45] Date of Patent: Nov. 9, 1993

[54] APPARATUS FOR MEASURING FORCES ON A FISHING ROD

[75] Inventors: James W. Kruse, New Haven; Gary Krutz; Charles Sherwood, both of West Lafayette, all of Ind.

[73] Assignee: Outdoor Electronics, Ltd., West Lafayette, Ind.

[21] Appl. No.: 839,122

[22] Filed: Feb. 19, 1992

[51] Int. Cl.$^5$ .................. G01L 5/10; A01K 97/12
[52] U.S. Cl. .................. 73/862.391; 73/862.392; 73/862.53; 43/17
[58] Field of Search .............. 73/862.391, 862.451; 43/4, 17

[56] References Cited
U.S. PATENT DOCUMENTS
4,693,125 9/1987 Krutz et al. .............. 73/862.391

Primary Examiner—Richard E. Chilcot, Jr.
Assistant Examiner—R. Biegel

[57] ABSTRACT

Apparatus for detecting and measuring forces on a fishing rod due to pull on a fishing line associated with the rod or to a weight hanging on the rod, includes a transducer responsive to the deflection of the fishing rod to provide an output indicative of the amount of deflection of the fishing rod, and a timing circuit including a signal counter which counts signals during a time interval and provides a numerical display corresponding to the number of signals counted and thus the force being applied to the rod, the timing circuit being controlled by the transducer to vary the duration of the time interval during which signals are counted whereby the number of signals counted by the signal counter varies in correspondence with the amount of force being applied to the rod. In one embodiment, the transducer includes a wire having its ends attached to the under surface of the rod inside chamber and a potentiometer connected in the timing circuit and having its wiper mechanism connected to the wire and movable thereby when the rod deflects, whereby the resistance of the potentiometer varies with rod deflection, varying the duration of the time interval during which the signal counter is enabled to count signals.

12 Claims, 3 Drawing Sheets

APPARATUS FOR MEASURING FORCES ON A FISHING ROD

This invention relates to fishing apparatus, and more particularly, to apparatus for use with a fishing rod for detecting and measuring forces on the fishing rod due to pull on a fishing line attached to the rod or to a weight hanging on the rod.

In U.S. Pat. No. 4,693,125 of Gary W. Krutz and James W. Kruse, there is disclosed an apparatus for detecting and indicating forces on a fishing rod due to pull on a fishing line attached to the rod or to a weight hanging on the rod. The apparatus detects such forces by sensing deflection of the rod caused by forces at the tip of the rod. The apparatus includes a microprocessor which responds to an input indicative of rod deflection and computes information such as when a fish bites, the time which elapsed in catching the fish, the maximum force or pull on the line and the force-time product over the time interval that a fish is being caught, and the weight of the fish caught. The apparatus is microprocessor controlled and is operable in several modes. A keyset enables selection of the operating mode as well as the selection of the information to be displayed. The microprocessor and display unit are contained in a housing which is mounted on the fishing rod with which it is used.

This prior art force detecting and measuring apparatus is extremely versatile and it generates and displays a large amount of information which is selectable by the fisherman. However, this apparatus is characterized by high cost due to the requirement for a programmed microprocessor for generating the information to be displayed, a relatively large display unit to display all the information that can be provided by the apparatus, and need for a keyset to select the operating mode and the information to be displayed and to enter command information to the microprocessor during use of the apparatus. Moreover, the apparatus is characterized by relatively high power requirements, an undesirable condition because the apparatus must be battery-powered in order to be practical. Also, the apparatus is somewhat difficult to use because of its large number of functions and operating modes. In addition, the apparatus is designed to be mounted on the fishing rod with which it is used, adjacent to the handle and/or reel, and because of its size, the presence of the unit on the fishing rod may interfere with proper use of the rod and reel.

SUMMARY OF THE INVENTION

It is an object of the present invention to provide an improved apparatus for detecting and measuring forces on a fishing rod.

A further object of the invention is to provide an apparatus for detecting and measuring forces on a fishing rod which apparatus is of lower cost and easier to use than prior art apparatus.

Another object of the invention is to provide an apparatus for detecting and measuring forces on a fishing rod which apparatus is characterized by low power requirements.

Yet another object of the present invention is to provide an apparatus for detecting and measuring forces on a fishing rod which apparatus includes a transducer which is integrated into the fishing rod with which it is used.

These and other objects are achieved by the present invention which provides apparatus for detecting and measuring forces on a fishing rod. The apparatus comprises transducer means responsive to the deflection of the fishing rod to provide an output indicative of the amount of force on the fishing rod, and detecting means including signal generating means for producing signals at a predetermined frequency, signal counting means for counting signals generated by the signal generating means and timing means for enabling the signal counting means to count signals generated by the signal generating means during a time interval, the timing means being controlled by the transducer means to vary the duration of the time interval whereby the number of signals counted by the signal counting means varies with the amount of deflection of the rod.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

DESCRIPTION OF A PREFERRED EMBODIMENT

Figure 1:
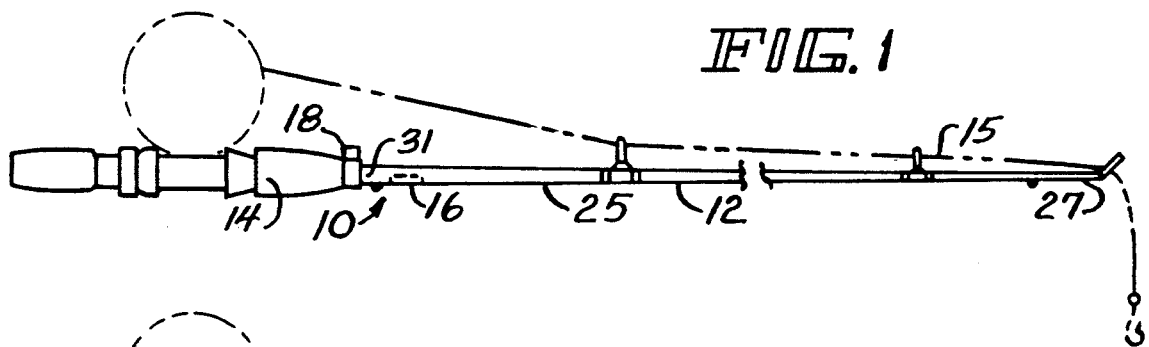
FIG. 1 is a view of a fishing rod incorporating a force detecting and measuring apparatus provided by the present invention.
Figure 2:
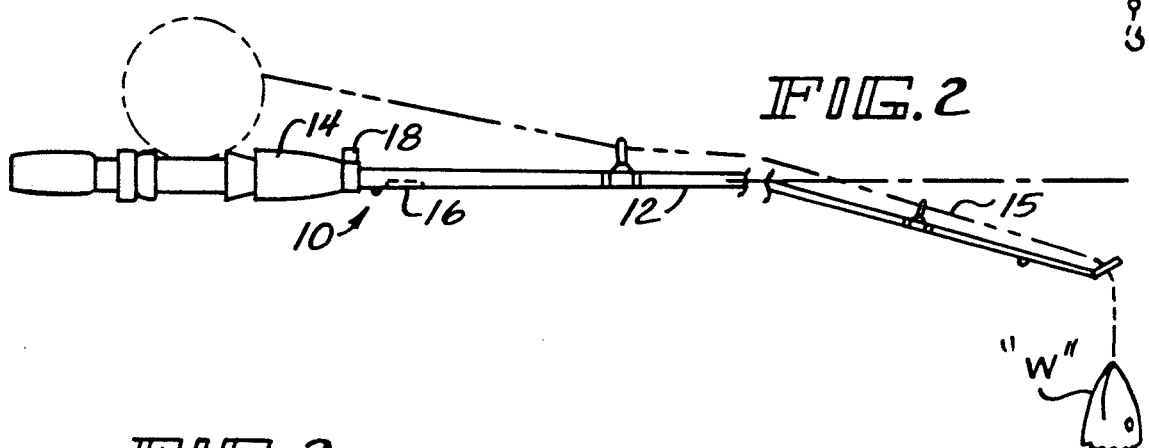
FIG. 2 is a view similar to that of FIG. 1, but illustrating the fishing rod deflected.

Referring to FIGS. 1 and 2, the force detecting and measuring apparatus 10 provided by the present invention is mounted on or inside a fishing rod 12 near the handle 14 of the rod. The apparatus detects forces on the rod due to pull on a fishing line 15 attached to the rod, as when a fish "W" is "hooked", or forces on the rod due to a weight hanging on the rod. The weight may be a "caught" fish suspended from the tip of the rod to weigh the fish. The forces on the rod are measured by sensing the amount of deflection of the fishing rod 12 caused by the forces on the rod. The apparatus senses deflection, calculates the force causing the deflection, and displays a numerical value for the force measured to the fisherman.

Figure 3:
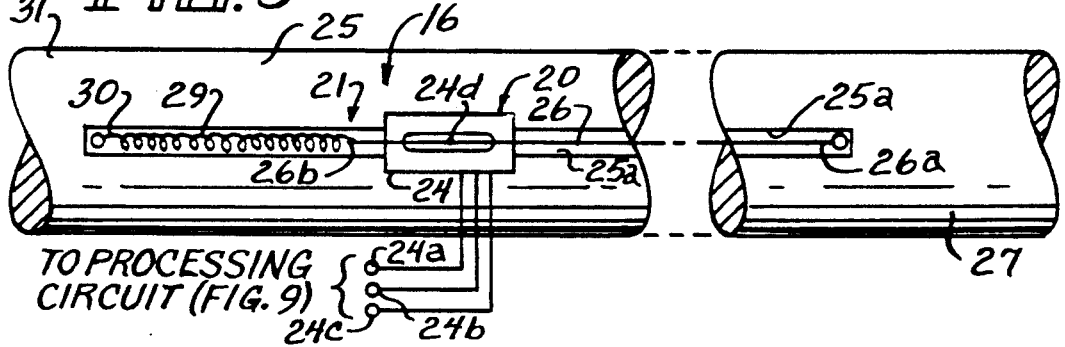
FIG. 3 is an enlarged view of a portion of a fishing rod illustrating one embodiment of a transducer for the force detecting and measuring apparatus illustrated in FIG. 1.

Referring to FIGS. 1 and 3, the apparatus 10 includes a transducer 16 on or in the under side of the rod and a detecting and indicating circuit 18 which may be mounted on or in the top side of the rod or of the handle 14 thereof as illustrated in FIG. 1. The detecting and indicating circuit 18 includes a signal processing circuit 50 and a display unit 57, illustrated in FIG. 9.

The transducer 16 includes a sensor 20 and an actuator 21, including a wire 26. The transducer sensor 20 provides an output which varies in correspondence with changes in the force being detected. The output of the sensor 20 may vary in a linear or a non-linear manner. In the exemplary embodiment, the sensor 20 comprises a linear potentiometer 2 which is connected in the signal processing circuit 50 and varies a parameter of the signal processing circuit 50 as a function of force on the rod 12. Potentiometer 24 has terminals 24a, 24b and 24c connected to the signal processing circuit 50. The potentiometer 24 is secured to the inside of the rod or to the under side 25 of the rod 12. The wiper mechanism 24d of the potentiometer 24 is connected to wire 26 of the actuator 21. The wire 26 extends within a groove 25a on the under side 25 of the rod 12 as normally held by the fisherman. The wire 26 has one end 26a attached to the under side 25 of the rod 12 near the tip 27 of the rod or at a splice between the ends of the rod. The other end 26b of the wire is attached to one end 28 of a spring 29 and to the wiper mechanism 24d. The other end 30 of the spring 29 is attached to the end 31 of the rod 12 opposite the end 27 at which the wire end 26a is attached, and on the under side 25 of (or inside) the rod. It is also possible to use a shorter wire and connect its ends to the ends of a lengthwise section or portion of the rod near the middle of the rod, but preferably towards its tip 27. The signal processing circuit 50 can be calibrated to indicate a given weight for a deflection measured by the circuit. Thus, the wire does not necessarily have to extend from one end 27 of the rod to the other end 31 of the rod. The length of the wire 26 is such that the spring 29 maintains the wire taut under all conditions.

Digressing, when the rod 12 is straight, i.e., not deflected, as illustrated in FIG. 1, the length of the rod is its nominal length. When the rod 12 bends, as illustrated in FIG. 2, the fibers or material on the inside of the bending radius of the rod are under compression and are therefore shorter or more compact than the nominal length or centerline of the rod. The attached wire 26 which is attached to the rod only at its ends, does not experience the compression when the rod 12 is deflected. Therefore, as the length of the rod 12 along its inside curvature becomes shorter due to deflection, the spring 29 pulls the end 26b of the wire 26 towards the end 31 of the rod, moving the wiper mechanism 24d of the potentiometer 24 towards the end 31 of the rod, i.e., to the left in FIG. 3. The movement of the wiper changes the value of the resistance between terminals 24a and 24c of the potentiometer 24. The amount of change in this resistance is linearly related to the amount of deflection of the fishing rod 12, and correspondingly to the weight of a fish or other object hanging from the tip end 27 of the rod (or from the fish line 15). When the weight is removed from the rod, the rod straightens, pulling the wire taut and stretching spring 29 so that the potentiometer wiper mechanism 24d is moved back to its initial or calibration position and the resistance between terminals 24a and 24c of the potentiometer 24 is returned to its initial value.

Figure 4:
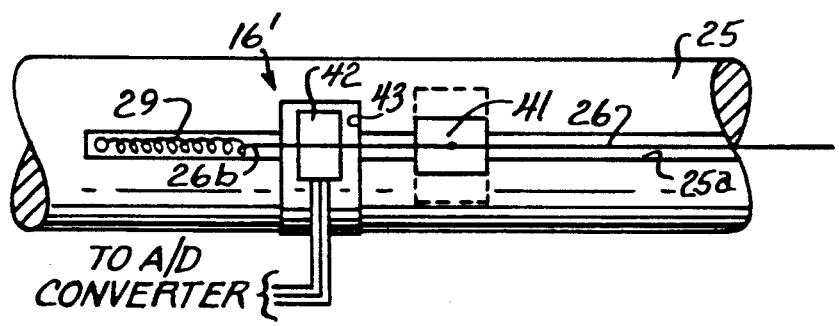
FIG. 4 is a view similar to that of FIG. 3, but illustrating a further embodiment for a transducer for the force detecting and measuring apparatus provided by the present invention.

Other devices, such as magnetic sensors or magnetic slope detectors, optic fiber, laser slope measuring devices or other optical devices may be used for measuring and deflection. Referring to FIGS. 1 and 4, in an alternative embodiment, the transducer 16' comprises a magnet 41 which is attached to the wire 26 and a suitable sensor 42, which may comprise a Hall effect sensor, for example. The sensor 42 is mounted in a recess 43 in the under surface 25 of the rod and the magnet 41 is movably mounted for movement towards and away from a position overlying the sensor 42. In this embodiment for the transducer 16', upon deflection of the rod 12, the spring 29 pulls the end 26b of the wire 26 towards the left in FIG. 4, moving the magnet 41 to the left in FIG. 4, closer to overlying the Hall effect sensor. This causes the signal output of the Hall effect sensor 42 to increase. The Hall effect sensor 42 is connected in circuit with an analog-to-digital converter (not shown), such as a voltage-to-frequency converter, which produces a digital signal indicative of the amount of rod deflection. The digital signal controls a display unit 57 to provide a numerical display of the value of force detected.

Figure 5:
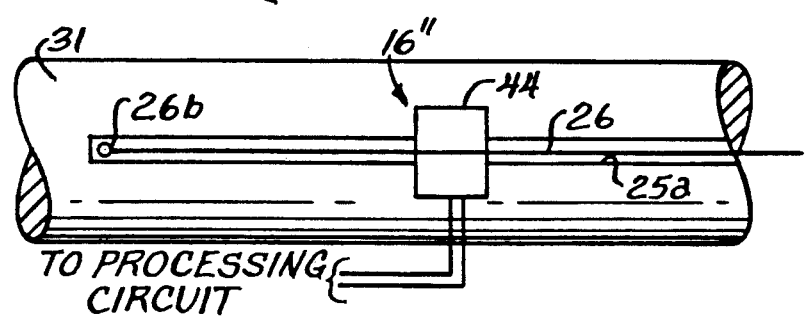
FIG. 5 is a view similar to that of FIG. 3, but illustrating another embodiment for a transducer for the force detecting and measuring apparatus provided by the present invention.

Referring to FIGS. 1 and 5, in accordance with a further embodiment of the present invention, the transducer 16" includes a magnet type sensor 44 which senses change in the diameter of a wire 26. Wire 26 has one end 26a connected directly to the tip 27 of rod 12 as in FIG. 3, and its end 26b connected directly to the rod 12 near its end 31 and held taut or stretched when the rod is not deflected. The magnetic sensor 44 produces an electromagnetic field around a portion of the wire 26. As the rod deflects, tension on the wire is reduced and the wire restores causing an increase in its diameter, changing the amount of conductive material in the electromagnetic field, disturbing the field. The transducer senses the change in the field and produces an output which is applied to a suitable processing circuit (not shown). The processing circuit generates an output for controlling a display unit 57 to provide a numerical display of the value of the force detected.

Figure 6:
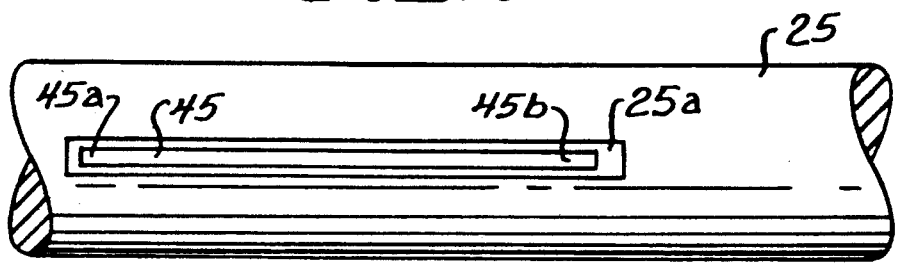
FIG. 6 is an enlarged view of a portion of a fishing rod having force detecting and measuring apparatus which includes a strain gauge.

Referring to FIG. 6, in another embodiment, the transducer comprises a strain gauge 45 which is mounted in a groove 25a in the under surface 25 of the rod, or integral with the rod. The strain gauge 45 is an elongated element extending lengthwise of the rod and is secured to the rod along the entire length of the strain gauge 45 or at least at its ends 45a and 45b. The strain gauge 45 is located anywhere along the length of the rod, but preferably near the mid point of the rod at a location where rod deflection is less than at the tip 27 of the rod. The strain gauge may produce an output in the form of a change in resistance, an electrical signal, or other form as a function of the type of strain gauge element employed. The strain gauge is connected in circuit with a suitable processing circuit, similar to processing circuit 50 (FIG. 9) to change a parameter or otherwise produce a change in the circuit operation which is indicative of the amount of deflection of the rod.

Figure 7:
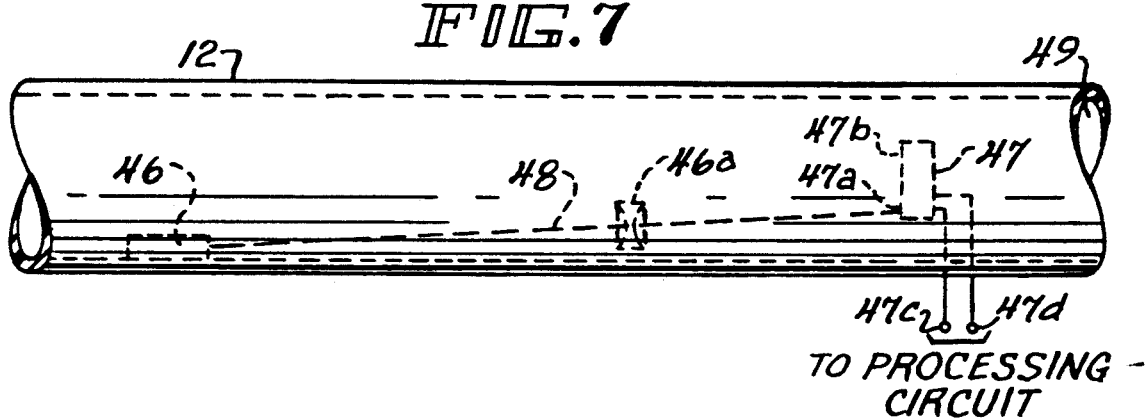
FIG. 7 is an enlarged view of a portion of a fishing rod having force detecting and measuring apparatus, which includes an optical system.

Referring to FIG. 7, in accordance with a further embodiment of the invention, the transducer comprises an optical system including a source 46 of light or other radiation, such as a laser diode, a detecting device 47 and a lens or other radiation collimating device 46a interposed between the light source 46 and the detector 47. In this embodiment, the rod 12 is hollow and has an axial bore 49 therethrough. The light source 46, lens 46a and detector 47 are located on the inside of the rod in the bore 49 during manufacture of the rod.

Figure 8:
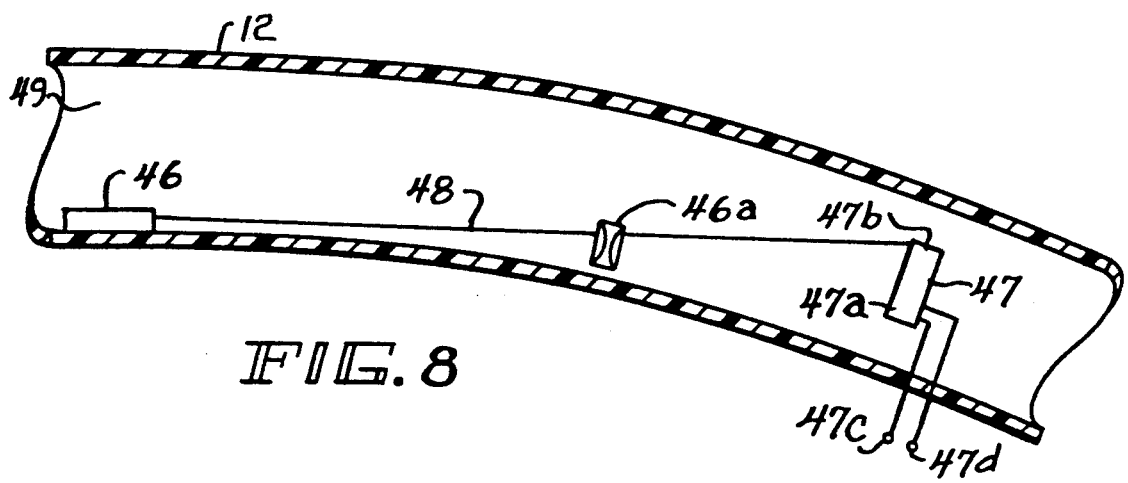
FIG. 8 is a view similar to FIG. 7, but illustrating the fishing rod deflected.

The light source 46 directs a beam of light 48 through the lens 46a to the detector 47 which is spaced apart lengthwise of the rod from the source of light 46. The detector is so constructed and located within the rod that light impinges on a light sensitive surface of the detector 47 near one end 47a thereof when the rod is straight and near the other end 47b when the rod is deflected, as illustrated in FIG. 8. The sensitivity of the detector 47 to light varies linearly from its end 47a to its end 47b so that the output produced by the detector changes in correspondence with deflection of the rod. The detector 47 is connected by suitable conductors 47c and 47d to a suitable processing circuit (not shown) which responds to change in the output of the detector 47 to produce an indication of the deflection detected and thus the force on the end 27 of the rod.

Figure 9:
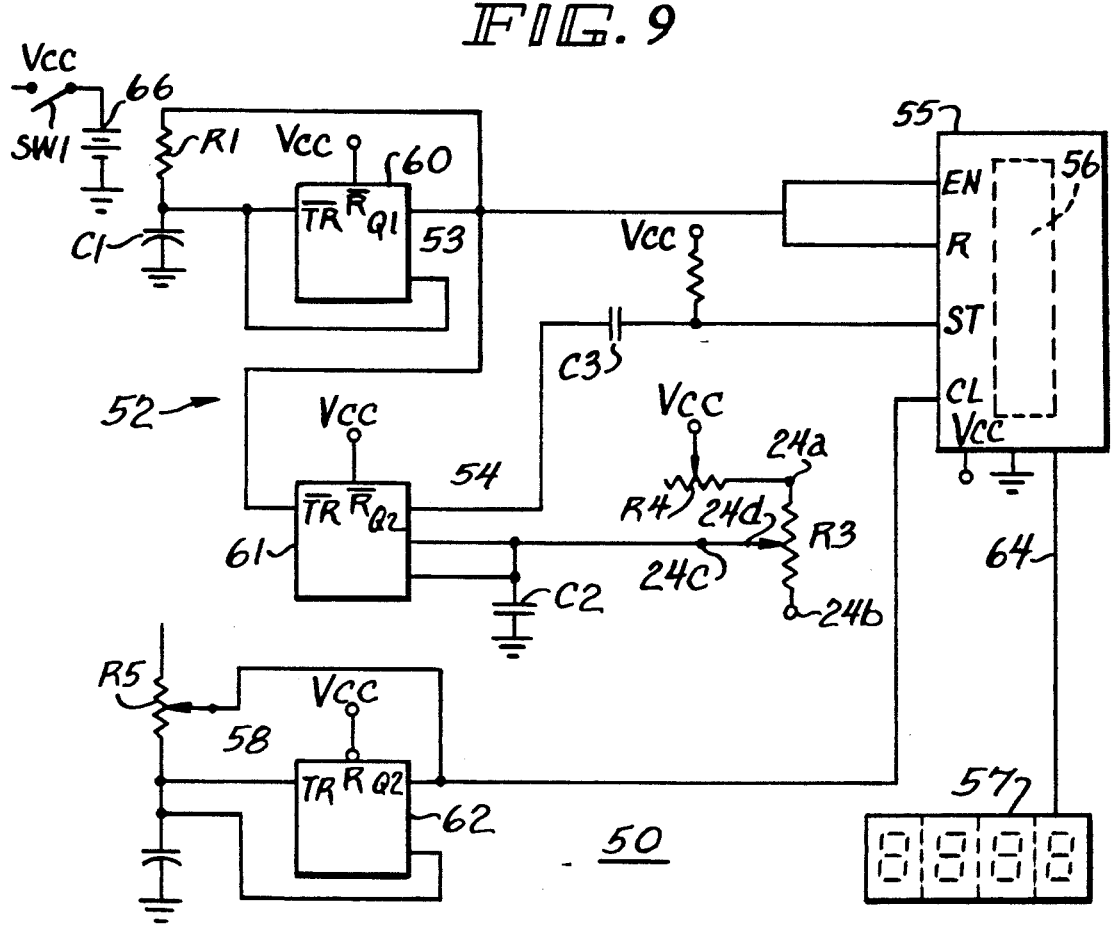
FIG. 9 is a schematic circuit and partial block diagram for electronic circuits of the force detecting and measuring apparatus provided in accordance with one embodiment of the present invention.

Referring to FIG. 9, there is illustrated a block diagram of the signal processing circuit 50 of the measuring apparatus 10 shown in FIG. i. The circuit 50 processes the output signal provided by the transducer 16 and provides a digital display of the force measured. The processing circuit 50 comprises a timing circuit 52, including a system timer 53 and a cycle timer 54, a display driver circuit 55 which includes a counter 56, a display unit 57, and a clock signal generating circuit 58.

The system timer 53 comprises a timing circuit 60 connected for operation as an astable circuit which produces a square wave signal at a frequency established by resistor R1 and capacitor C1. In the exemplary embodiment, the system timer 53 provides a square wave signal at a frequency of three Hertz, illustrated in FIG. 10, line B.

Figure 10:
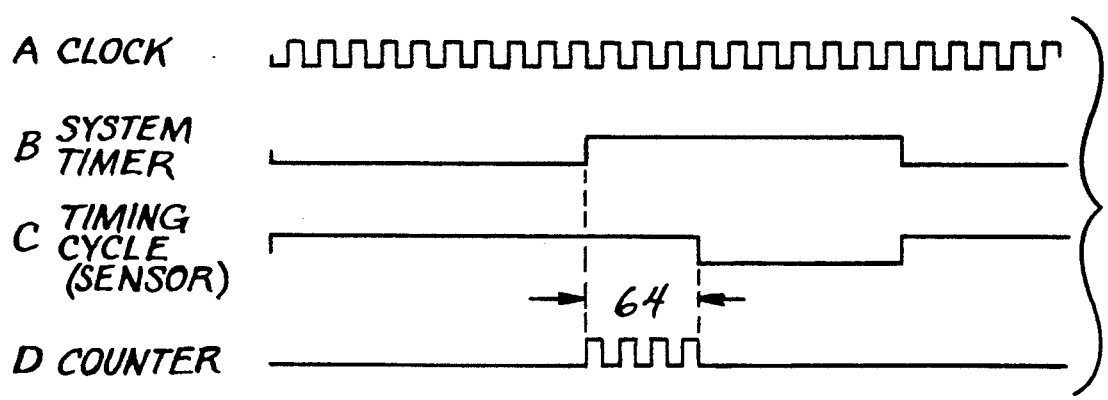
FIG. 10 is a timing chart illustrating the relationship for timing signals produced by the electronic circuits illustrated in FIG. 9.

The cycle timer 54 includes a timing circuit 61 connected for operation as a monostable circuit which provides a square wave output signal, FIG. 10, line C, the duration of which is established by the value of resistance R3 which comprises the potentiometer 24 of sensor 20. A further variable resistance R4 provides a zero adjust for the cycle timer 54.

The clock signal generating circuit 58 includes a timing circuit 62 connected for operation as an astable circuit which generates an output signal at a preselected frequency which is established by resistor R5 and capacitor C4. In the exemplary embodiment, the output signal is a train of square wave clock pulses, as shown in FIG. 10, line A. The frequency of the clock pulses is 60 Hertz. The display driver circuit 55 includes a controllable counter 56 which responds to control signals provided by the timing circuit 52 to count clock pulses provided by the clock signal generating circuit 58 during a time window 64, see FIG. 10, line C, the duration of which is proportional to the amount of deflection of the rod, and thus the value of the force on the rod which causes the rod to deflect.

The counter 56 has a reset input R and an enable input EN which are commonly connected to the output Q1 of the system timer 53. The output of system timer 53 is also connected to a trigger input TR of the cycle timer 54. The counter has a clock input CL which is connected to the output Q2 of the signal generating circuit 58. The counter 56 has a store input ST which is connected through capacitor C3 to the output Q2 of the cycle timer 54. The display driver circuit 55 controls the display unit 57 which is a four digit liquid crystal display unit.

By way of example, the timing circuits 60 and 61 of the system timer 5 and the cycle timer 54 each comprise one section of a type ICM 7556 timer circuit commercially available from Maxim. The timing circuit 62 of the signal generating circuit 58 comprises a type ICM 7555 timer commercially available from Maxim. The display driver circuit 55 is the type 75C947 commercially available from National Semiconductor. The liquid crystal display unit 57 comprises the type LCD03, commercially available from Hamlin Inc. The circuit 18 includes a 3 volt battery 66 which is connected to power supply terminal Vcc by a power switch SW1.

The zero adjustment potentiometer R4 is set so that the reading, i.e., the initial or calibration value, on the display unit 57 is zero when there is no weight on the rod 12. The frequency of the clock signals produced by the clock signal generating circuit 58 is adjusted by adjusting the value of resistance R5 to provide a reading of "1" on the display unit 57 when a one pound weight is suspended from the tip of the rod.

Referring now to FIGS. 9 and 10, each time the output of the system timer 53 goes to a logic low level (FIG. 10, line B), the counter 56 of the driver circuit 55 is reset to zero. Also, the cycle timer 54 is enabled and its output goes to logic high level as illustrated in FIG. 10, line C. During the time that the output of the system timer 53 is at a logic low level, the counter 56 of the driver circuit 55 is held in its reset state.

When the output of the system timer 53 goes to a logic high level, the counter 56 of the driver circuit 55 is enabled to begin counting. The counter 56 counts clock signals provided by the signal generating circuit 58 until the output of the cycle timer 54 goes to a logic low level. As shown in FIG. 10, line D, in the example, four signals or pulses are counted during the window 64 defined by the transition from a logic low level to a logic high level of the output signal of the system timer 53 (FIG. 10, line B) and the transition from a logic high level to a logic low level for the signal output of the cycle timer 54 (FIG. 10, line C).

The frequency or period of the cycle timer 54 is determined by the resistance provided between terminals 24a and 24c of potentiometer R3 which comprises the sensor 20. Accordingly, with any increase in the amount of deflection of the rod 12, the resistance of potentiometer 24 increases. Consequently, the length of the sampling window increases, and correspondingly, the number of signals that are counted by the counter circuit increases. The driver circuit 55 controls the display unit 57 to display a digital value corresponding to the forces due to pull on the fishing line which is attached to the rod 12, or to a fish "W" hanging on the rod 12.

Thus, when there is no weight on the tip 27 of the rod and therefore no deflection of the rod, the cycle timer 54 times out at the same time that system timer 53 enables the signal counter 56. Accordingly, no signals or pulses are registered by the counter 56. When there is a force on the tip of rod 12 (FIG. 2), as caused by a fish pulling on the line 15, or a fish suspended from the rod, the period of the cycle timer 54 is increased. For such condition, the signal output of the cycle timer 54 remains at a logic high level for a time period after the system timer 53 enables the counter 56 to begin registering the pulses or signals applied to its clock input during this time period. The length of this time period is determined by the amount of increase in the resistance of the potentiometer R3 which in turn is dependent upon the amount of rod deflection. The processing circuit 50 controls the display unit to provide a numerical display of the force value which caused the rod deflection. When the fish is removed from the tip of the rod, the rod restores to its "at-rest" condition and the potentiometer resistance is restored to its initial or calibration value. The cycle timer 54 times out at the same time that the system timer 53 enables the counter and so no pulses or signals are registered and the reading displayed by the display unit is zero.

We claim:

1. Apparatus for detecting and measuring forces on a fishing rod due to pull on a fishing line associated with the rod or to a weight hanging on the rod, comprising:
   transducer means responsive to the deflection of the fishing rod to provide an output indicative of the amount of force on the fishing rod; and
   detecting means including signal generating means for producing signals at a predetermined frequency, signal counting means for counting signals generated by the signal generating means and timing means for enabling said signal counting means to count signals generated by said signal generating means during a time interval, said timing means including first timing circuit means and second timing circuit means, said first timing circuit means providing a timing signal at a predetermined frequency, said signal counting means being responsive to said timing signal to start counting signals generated by said signal generating means, said second timing circuit means being controlled by said transducer means for causing said signal counting means to stop counting signals whereby the number of signals counted by said signal counting means corresponds to the amount of deflection of the rod.

2. Apparatus according to claim 1, wherein said detecting means includes indicating means controlled by said signal counting means to provide an indication of the value of force detected.

3. Apparatus according to claim 1, wherein said indicating means comprises a display means controlled by said signal counting means to provide a numerical display representative of the value of the force detected.

4. Apparatus according to claim 1, wherein said second timing circuit means is responsive to said timing signal to provide a further timing signal for disabling said signal counting means, the duration of the further timing signal being determined by said transducer means.

5. Apparatus according to claim 1, wherein said transducer means comprises means for varying a parameter of said detecting means, the amount of variation of said parameter being proportional to the amount of deflection of the rod.

6. Apparatus according to claim 5, wherein said transducer means includes a variable resistance having a wiper and actuating means connected to said rod and to said wiper for moving said wiper in correspondence with deflection of the rod.

7. Apparatus according to claim 6, wherein said actuating means comprises a wire having first and second ends connected to said rod near first and second ends thereof, said wiper being connected to said wire and movable with the wire.

8. Apparatus according to claim 1, wherein said transducer means is mounted on an under surface of the rod.

9. Apparatus according to claim 1, wherein said transducer means is located within the rod.

10. Apparatus for detecting and measuring forces on a fishing rod due to pull on a fishing line associated with the rod or to a weight hanging on the rod, comprising:
    transducer means for sensing the amount of deflection of the fishing rod caused by the force on the fishing rod; and
    detecting means including signal generating means for producing signals at a predetermined frequency, signal counting means for counting signals generated by the signal generating means and timing means for establishing a timing window during which said signal counting means is enabled to count signals generated by said signal generating means, said timing means including first timing circuit means and second timing circuit means, said first timing circuit means providing a timing signal at a predetermined frequency, said counting means being responsive to said timing signal to start counting signals generated by said signal generating means, said second timing circuit means being responsive to said timing signal provided by said first timing circuit means to generate a stop signal for causing said signal counting means to stop counting signals produced by said signal generating means, said second timing circuit means being controlled by said transducer means to cause the number of signals counted by said signal counting means to correspond to the amount of rod deflection measured by said transducing means.

11. Apparatus according to claim 10, wherein said detecting means includes a display means controlled by said signal counting means to provide a numerical display representative of the value of the force detected.

12. Apparatus according to claim 10, wherein said transducer means comprises means for varying a parameter of said timing means, the amount of variation being proportional to the amount of deflection of the rod.

* * * * *

UNITED STATES PATENT AND TRADEMARK OFFICE
CERTIFICATE OF CORRECTION

PATENT NO. : 5,259,252
DATED : November 9, 1993
INVENTOR(S) : James W. Kruse, Gary Krutz and Charles Sherwood It is certified that error appears in the above-indentified patent and that said Letters Patent is hereby corrected as shown below:

| COLUMN | LINE | |
|---|---|---|
| 3 | 31 | Delete "2" and insert -- 24 -- |
| 5 | 38 | Delete "i" and insert -- 1 -- |
| 6 | 2 | Delete "5" and insert -- 53 -- |

Signed and Sealed this

Nineteenth Day of April, 1994

*Attest:*

BRUCE LEHMAN

*Attesting Officer*  *Commissioner of Patents and Trademarks*